Patented Mar. 19, 1940

2,194,205

UNITED STATES PATENT OFFICE 2,194,205

TREATMENT OF POLYVINYL ACETAL RESINS

William O. Kenyon and Thomas F. Murray, Jr., Rochester, N. Y., assignors, by mesne assignments, to Eastman Kodak Company, Rochester, N. Y., a corporation of New Jersey No Drawing. Application June 30, 1936, Serial No. 88,150

8 Claims. (Cl. 260—73)

This invention relates to a treatment of resins and more particularly to a treatment of resins of the polyvinyl acetal type, the treatment serving to stabilize the resins.

Polyvinyl acetal resins can be prepared by treating a polyvinyl alcohol with a compound containing a reactive carbonyl group, i. e. an aldehyde or ketone such as a cyclic ketone, in the presence of an acetal condensation agent. A number of acetal condensation agents have been proposed and certain mineral acids have been found suitable, for example, sulfuric acid. Polyvinyl acetal resins can also be prepared by reacting a polyvinyl ester, such as a polyvinyl acetate, with a compound containing a reactive carbonyl group, in the presence of a deesterifying agent, a deesterifying catalyst and an acetal condensation catalyst. Certain mineral acids have been found to function suitably as deesterifying catalysts and also concomitantly as acetal condensation catalysts. Sulfuric acid is especially satisfactory. Resins prepared by the first of the above methods are ordinarily thought of as consisting of polyvinyl chains to which are attached acetal groups and hydroxyl groups. Resins prepared by the second of the above methods are generally thought of as consisting of polyvinyl chains attached to which are acetal groups and hydroxyl groups, or, if the deesterification is but partial, acetal, hydroxyl and ester groups.

Resins prepared by either of the above methods, while appearing to be stable bodies and actually possessing stability sufficient for certain purposes, are sometimes possessed of an instability which can be measured by subjecting the resin, which has been washed to substantial neutrality and dried, to an accelerated aging test comprising heating the resin in a stream of nitrogen at about 180° C., collecting the organic decomposition products, burning the same to carbon dioxide and water over heated copper oxide and weighing the amount of dry carbon dioxide formed. For any given resin, the amount of carbon dioxide produced in a given time is a measure of the instability, unstable resins usually showing increasing amounts of carbon dioxide with time. This test is a severe one and a resin responding favorably probably is as stable as polyvinyl acetal resins can be made by practical means. It is to be understood that instability as used hereinafter means instability as measured by this somewhat drastic method outlined above or its equivalent.

The reason for the instability of these polyvinyl acetal resins is not clear at present, but it is possible that it is induced by groups attached to the polyvinyl chains other than the above mentioned acetal, hydroxyl and ester groups. These additional and unstable groups may be, at least in part, hemi-acetal (as contrasted with acetal) groups.

Resins made by the first of the above processes are, in general, apparently more stable than those prepared by the second of the above processes. However, even the resins of the first process sometimes possess a small instability. Resins prepared by the second process, we have found, are more or less unstable depending upon the conditions under which they are made. For example, resins made by the second process at higher temperatures or with higher concentrations of catalyst are ordinarily possessed of color and/or poorer solubilities in organic solvents, such as acetone. This poorer solubility may be due to cross-linking between polyvinyl chains. A certain instability may be associated with the colored side-reaction products found in the resins prepared according to the second method at higher temperatures or with higher concentrations of catalyst. Resins prepared by the second method (that is, from a polyvinyl ester) at lower temperatures and with lower concentrations of catalyst as described in the copending application of Charles R. Fordyce and Martti Salo, Serial No. 85,732 filed June 17, 1936 are substantially devoid of such colored side-reaction products as just mentioned and accordingly are devoid of any instability which may be induced by such side-reaction products. However, resins prepared by the second method at lower temperatures and lower concentration of catalyst, we have found, are sometimes beset with an instability which appears to be due to hemi-acetal groups. The resins prepared by either of the above processes and under any of the above conditions appear to contain a smaller or larger hemi-acetal group content or some other similarly unstable group content which we have found can be removed and the resin consequently substantially stabilized, insofar as instability due to hemi-acetal or similarly unstable groups is concerned, by applying a treatment to the resin comprising a mild hydrolysis or alcoholysis insufficient to appreciably affect the acetal or ester groups present in the resin.

The following examples serve to illustrate but are not intended to limit our invention:

*Example 1.*—A polyvinyl acetal resin low in hydroxyl and acetate group content prepared by reacting a polyvinyl acetate with acetaldehyde in the presence of ethyl alcohol, ethyl acetate and an amount of sulfuric acid equivalent to not more than 5 per cent by weight of the total reaction mixture, at a temperature of about 40° C., and under such conditions that the reaction mixture is homogeneous throughout, when precipitated from the reaction mixture with water, washed substantially free from acid and dried gave the following amounts of carbon dioxide when heated in a stream of nitrogen at 180° C., as described above:

| Minutes | Gm. per gm. sample |
|---|---|
| 20 | .0051 |
| 40 | .0091 |
| 60 | .0114 |
| 80 | .0125 |
| 100 | .0134 |
| 160 | .0154 |

Ten parts of this resin, in a flaky or shredded form, were suspended in about 400 parts of water containing about 2.36 parts of hydrochloric acid (sp. g. 1.18) and the whole was allowed to stand at about 20° C. for about twenty-two hours. After washing and drying the resin, it gave the following stability test:

| Minutes | Gm. per gm. sample |
|---|---|
| 20 | .0009 |
| 40 | .0014 |
| 60 | .0016 |
| 80 | .0021 |
| 100 | .0024 |
| 160 | .0032 |

The smaller amounts of carbon dioxide formed when the resin had been treated indicate a lesser decomposition under the heating at 180° C. and accordingly a more stable resin. The solubility of the treated resin in organic solvents, such as acetone, was substantially that of the untreated resin indicating that the acetal and ester groups had not been appreciably affected.

*Example 2.*—A polyvinyl acetal resin low in hydroxyl and acetate group contents prepared by reacting a polyvinyl ester with acetaldehyde, in the presence of ethyl alcohol and an amount of sulfuric acid equivalent to not more than about 5 per cent by weight of the total reaction mixture at a temperature of about 40° C., when precipitated from the reaction mixture with water and washed substantially free from acid gave the following amounts of carbon dioxide when heated in a stream of nitrogen at 180° C. as described above:

| Minutes | Gms. $CO_2$ per gm. sample |
|---|---|
| 20 | .0044 |
| 40 | .0097 |
| 60 | .0138 |
| 80 | .0160 |
| 100 | .0180 |
| 160 | .0231 |

Five parts of the resin, in a flaky or shredded form, were suspended in 200 parts of water containing about 1.18 parts of hydrochloric acid (sp. g. 1.18) and the whole was warmed on the steam bath for about twenty-one hours. After washing and drying, it gave the following stability test:

| Minutes | Gm. $CO_2$ per gm. sample |
|---|---|
| 20 | .0022 |
| 40 | .0034 |
| 60 | .0037 |
| 80 | .0043 |
| 100 | .0049 |
| 160 | .0049 |

*Example 3.*—Five parts of the unstable resin of Example 2 were suspended in 200 parts of water containing 2.5 parts of urea and the whole warmed in the steam bath for about twenty-one hours. After washing and drying the resin gave the following stability test:

| Minutes | Gms. $CO_2$ per gm. sample |
|---|---|
| 20 | .0047 |
| 40 | .0064 |
| 60 | .0087 |
| 80 | .0111 |
| 100 | .0120 |
| 120 | .0127 |
| 160 | .0137 |

The urea here probably acts as an aldehyde acceptor, tending to combine with any aldehyde produced by hydrolysis of hemi-acetal groups. The stabilization is less effective than in Example 2.

*Example 4.*—A polyvinyl acetal resin low in hydroxyl and acetate group content prepared by reacting a polyvinyl acetate with a mixture of acetaldehyde and butyraldehyde, in the presence of ethyl alcohol, ethyl acetate and an amount of sulfuric acid equivalent to not more than 5 per cent by weight of the total reaction mixture, at a temperature of about 40° C., when precipitated from the reaction mixture, washed and dried gave the following stability test:

| Minutes | Gm. $CO_2$ per gm. sample |
|---|---|
| 20 | .0550 |
| 40 | .1360 |
| 60 | .1620 |
| 80 | .1790 |
| 100 | .1935 |
| 160 | .2139 |

The rather marked instability of this resin was due in part to the fact that this resin contained a small amount of sulfuric acid. Probably this acid was retained both by occlusion and in some more securely bound form, perhaps as a sulfuric ester.

Ten parts of this resin, in a shredded or flaky form, were suspended in 400 parts of distilled water and heated on the steam bath for about twenty-one hours. After thorough washing and drying, the resin gave the following stability test:

| Minutes | Gm. $CO_2$ per gm. sample |
|---|---|
| 20 | .0067 |
| 40 | .0204 |
| 60 | .0274 |
| 80 | .0323 |
| 100 | .0363 |
| 160 | .0454 |

This water treatment clearly produced a more stable resin. The improvement in stability is probably due to the fact that the occluded sulfuric acid was leached out of the resin during the treatment and is also probably partly due to the fact that bound sulfuric acid in the form of an ester was at least partly hydrolyzed and released. A small amount of the hemi-acetal groups may also have been hydrolyzed off. However, the resin was not adequately stabilized and the reason for this is probably that the hydrogen ion concentration of the treating bath was insufficient to adequately promote hydrolysis of the unstable groups in their entirety, at least within a reasonable time. Prolonged treatment with water in the manner indicated further improves the stability. If this water-treated resin (ten parts) or the original resin (ten parts) be now suspended in 400 parts of water containing 1.84 parts of sulfuric acid (sp. g. 1.84) and the suspension warmed on the steam bath for about twenty-one hours, the resin thoroughly washed and dried, the following stability test is obtained:

| Minutes | Gm. CO$_2$ per gm. sample |
| --- | --- |
| 20 | .000 |
| 40 | .0003 |
| 60 | .0006 |
| 80 | .0010 |
| 100 | .0016 |
| 160 | .0032 |

This further treated resin is possessed of adequate stability for practically all purposes. Polyvinyl acetal resins of a stability indicated in this example and Examples 1 and 2, i. e. a stability of about .0032 gm. or .0049 gm. of CO$_2$ per gram of resin heated, are more stable than any heretofore known polyvinyl acetal resins, particularly polyvinyl acetal resins made by treating a polyvinyl ester with a deesterifying agent, a compound containing a reactive carbonyl group and a mineral acid.

Probably the most advantageous method of arriving at satisfactory stabilization is that given in Example 1. Other polyvinyl acetal resins can be similarly stabilized, for example, polyvinyl formaldehyde acetal resins, polyvinyl benzaldehyde acetal resins, polyvinyl formaldehyde-acetaldehyde acetal resins or the like. Acids other than hydrochloric acid can be used in Examples 1, 2 and 4, for instance, sulfuric, phosphoric or the like. However, hydrochloric acid and sulfuric acid appear to have particular advantages. Acid reacting salts can be employed instead of acids, for instance, ammonium chloride, ammonium sulfate, zinc chloride or the like. However strong acids appear to be preferable. Aldehyde acceptors other than urea can be used in Example 3, for instance, other amides, primary or secondary amines or other bodies capable of reacting with aldehydes. It is advantageous in all cases to apply the stabilizing treatment to the freshly precipitated resin.

Instead of hydrolytic treatments as illustrated in the above examples, corresponding alcoholytic treatments can be applied, primary and secondary alcohols being suitable, for example methyl, ethyl or isopropyl alcohols.

The untreated resins can be acted upon with neutralizing agents to dissipate the last traces of acid, if desired, before the mild hydrolytic or alcoholytic treatment is applied. Likewise the resin after treatment for stabilization can be acted upon with neutralizing agents to dissipate the last traces of acid employed in the stabilization. Neutralizing agents such as sodium acetate, ammonia or basic organic amines, sodium carbonate or sodium hydroxide are suitable.

As an alternative method of arriving at stable resins by a mild hydrolytic treatment, the resin prepared as in the above examples can be precipitated with vigorous stirring from the reaction mixture with water and allowed to stand in the acid water (acid because of the sulfuric or other catalyst acid present) at 20 to 25° C. or higher temperature until a mild hydrolysis and consequent stabilization obtains, followed by washing free from acid with or without neutralization with suitable neutralizing agents such as ammonia or basic organic amines. Similar to such a procedure, water or an alcohol, such as ethyl alcohol, can be added to the reaction mixture, in an amount just insufficient to precipitate the resin from the reaction mixture, and the whole allowed to stand until stabilization is effected. This latter procedure is ordinarily less effective owing to the fact that most such reaction mixtures contain a substantial proportion of excess aldehyde which tends to prevent hydrolysis or alcoholysis of the hemi-acetal groups. In either of these alternative methods material to reduce the hydrogen ion concentration of the stabilizing medium can be added, for example sodium acetate, ammonia, sodium hydroxide, sodium phosphate, basic organic amines or the like.

Since we have found hydrochloric acid to be particularly useful in effecting stabilization as indicated in the above examples, it is advantageous to take a resin prepared as indicated in the above examples and precipitate it into a soluble chloride, e. g. sodium chloride, solution, when the sulfuric acid acts upon the sodium chloride to generate hydrochloric acid which promotes the mild hydrolysis resulting in stabilization.

We have found it advantageous, particularly in the case of butyraldehyde acetal resins, butyraldehyde-acetaldehyde acetal resins or butyraldehyde-formaldehyde acetal resins to carry out the mild hydrolysis as indicated in the above examples employing 400 parts of dilute acetic acid, e. g. 30% by weight, with a small amount of a strong acid catalyst instead of 400 parts of water. The dilute acetic acid appears to swell the resin thereby permitting uniform mild hydrolysis as well as the release of occluded or even absorbed substances. Other swelling agents can be employed, for example, dioxane, alcohols or the like. These swelling agents are advantageously at least partially water miscible.

Our stabilizing process is not only applicable to polyvinyl acetal resins containing a low hydroxyl group content but to polyvinyl acetal resins containing a higher hydroxyl group content as well. Polyvinyl acetals in which as much as 50% of the available hydroxyl groups or more are uncombined can be stabilized, if desired.

In the claims polyvinyl acetal or polyvinyl acetal resin are intended to mean a condensation product of a polyvinyl compound containing hydroxyl groups with a compound containing a reactive carbonyl group, such as an aldehyde or cyclic ketone. Such condensation products can be made by concomitant deesterification of a polyvinyl ester and condensation of the deesterified product with compounds containing a reactive carbonyl group.

What we claim as our invention and desire to be secured by Letters Patent of the United States of America is:

1. A process for improving the stability and associated characteristics of a polyvinyl acetal resin containing, in addition to acetal groups, groups contributing to the instability of the resin, said process comprising hydrolyzing off a sufficient portion of said contributing groups to substantially improve the stability of the resin and discontinuing the hydrolysis prior to hydrolyzing off an appreciable portion of the acetal groups.

2. A process for improving the stability and associated characteristics of a polyvinyl acetal resin containing, in addition to acetal, ester and hydroxyl groups, groups contributing to the instability of the resin, said process comprising hydrolyzing off a sufficient portion of said contributing groups to substantially improve the stability of the resin and discontinuing the hydrolysis prior to hydrolyzing off an appreciable portion of the acetal and ester groups.

3. A process for improving the stability and associated characteristics of a polyvinyl acetal resin containing, in addition to acetal, ester and hydroxyl groups, group contributing to the instability of the resin, said process comprising hydrolyzing off, in the presence of an acid hydrolytic catalyst, a sufficient portion of said contributing groups to substantially improve the stability of the resin and discontinuing the hydrolysis prior to hydrolyzing off an appreciable portion of the acetal and ester groups.

4. A process for improving the stability and associated characteristics of a polyvinyl acetal resin containing, in addition to acetal, ester and hydroxyl groups, groups contributing to the instability of the resin, said process comprising hydrolyzing off, in the presence of a hydrochloric acid hydrolytic catalyst, a sufficient portion of said contributing groups to substantially improve the stability of the resin and discontinuing the hydrolysis prior to hydrolyzing off an appreciable portion of the acetal and ester groups.

5. A process for improving the stability and associated characteristics of a polyvinyl acetal resin containing, in addition to acetal, ester and hydroxyl groups, groups contributing to the instability of the resin, said process comprising hydrolyzing off, in the presence of an acid hydrolytic catalyst and a swelling agent for the resin, a sufficient portion of said contributing groups to substantially improve the stability of the resin and discontinuing the hydrolysis prior to hydrolyzing off an appreciable portion of the acetal groups.

6. A process for improving the stability and associated characteristics of a polyvinyl acetal resin prepared from a polyvinyl alcohol and an aldehyde employing a sulfuric acid condensation catalyst and containing, in addition to acetal groups, groups contributing to the instability of the resin, said process comprising hydrolyzing off, in the presence of a hydrochloric acid hydrolytic catalyst, a sufficient portion of said contributing groups to substantially improve the stability of the resin and discontinuing the hydrolysis prior to hydrolyzing off an appreciable portion of the acetal groups.

7. A process for improving the stability and associated characteristics of a polyvinyl acetal resin prepared from a polyvinyl ester and an aldehyde employing a sulfuric acid condensation catalyst and containing, in addition to acetal, ester and hydroxyl groups, groups contributing to the instability of the resin, said process comprising hydrolyzing off, in the presence of a hydrochloric acid hydrolytic catalyst, a sufficient portion of said contributing groups to substantially improve the stability of the resin and discontinuing the hydrolysis prior to hydrolyzing off an appreciable portion of the acetal and ester groups.

8. A process for improving the stability and associated characteristics of a polyvinyl acetal resin containing, in addition to acetal groups, groups contributing to the instability of the resin, comprising treating the resin with an agent selected from the group consisting of hydrolyzing agents and alcoholizing agents to remove a sufficient portion of said contributing groups to substantially improve the stability of the resin and discontinuing the treatment prior to removal of an appreciable portion of the acetal groups.

WILLIAM O. KENYON.
THOMAS F. MURRAY, Jr.